United States Patent [19]

Wisniewski

[11] Patent Number: 5,016,246
[45] Date of Patent: May 14, 1991

[54] DIGITAL TELEPHONE SYSTEM CIRCUITS

[75] Inventor: James J. Wisniewski, Sterling, Va.

[73] Assignee: Hubbell Incorporated, Orange, Conn.

[21] Appl. No.: 459,286

[22] Filed: Dec. 29, 1989

[51] Int. Cl.$^5$ .............................................. H04J 1/14
[52] U.S. Cl. ...................................... 370/76; 379/201;
375/41; 370/110.1
[58] Field of Search ......................... 370/76, 7, 110.1;
375/41, 83, 88, 17, 24; 379/201, 157, 93

[56] References Cited

U.S. PATENT DOCUMENTS

| | | | |
|---|---|---|---|
| 4,637,016 | 1/1987 | Ciancibello | 370/29 |
| 4,673,976 | 6/1987 | Wreford-Howard | 370/15 |
| 4,715,045 | 12/1987 | Lewis | 375/48 |
| 4,829,560 | 5/1989 | Evanyk | 370/17 |
| 4,901,344 | 2/1990 | Monette et al. | 379/93 |

OTHER PUBLICATIONS

Frank P. Tedeschi, *The Active Filter Handbook*, 1979, pp. 160-168.

Primary Examiner—Douglas W. Olms
Assistant Examiner—Christopher O. Edwards
Attorney, Agent, or Firm—Jerry M. Presson; Walter C. Farley

[57] ABSTRACT

A telephone system uses above voice-band ASK control and supervisory signals which are appended to digitally encoded voice by forcing the least significant bits to a selected level for transmission to the receiving end. At the receiving end, the ASK is regenerated by a circuit including special filter. To eliminate audible noise resulting from the filter action, the ASK signal is applied to a shaping circuit which shapes the leading and trailing ASK envelope into a gradually increasing and decreasing envelope. To detect the proper number of pulses in the signal, a threshold detector is used which follows the envelope, ignoring peaks of low amplitude after peaks of high amplitude.

6 Claims, 3 Drawing Sheets

DIGITAL TELEPHONE SYSTEM CIRCUITS

This invention relates to improvements in detection, correction and noise reduction circuitry for a digital telephone system particularly in the context of a private branch exchange.

BACKGROUND OF THE INVENTION

Digital equipment for use in a private branch exchange system has been developed to allow simultaneous voice and out-of-band signaling using 8 kHz ASK (amplitude-shift-keyed) signals for control and supervisory purposes. With relatively short transmission lines, the 8 kHz signals can simply be sent over the lines concurrently with the voice signals with no significant interference or degradation of voice transmission.

In an automatic private branch exchange system of this type, the telephone instruments can be electronic business sets (EBS) which are instruments having code-generating circuitry as part of the instrument itself so that lifting the receiver or depressing various buttons on the instrument causes generation of the ASK signals, with or without accompanying voice signals. The signals from the EBS pass through a hybrid circuit to a coder/decoder (CODEC) in which the voice signals are digitized and a special filter circuit recognizes the existence of the ASK signal. If the ASK is present, a signal sets the least significant bit of each 8-bit word in the coded voice signals to a selected level, e.g. "LOW". The resulting digitized signal is coupled onto the transmission line and is received at a CODEC in the central office. At the central office CODEC, the voice signal is reconstructed and the least significant bit is examined for an indication of the ASK signal. If that indication is present, the ASK signal is reconstructed and the resulting voice-ASK signal is passed through a hybrid circuit to a digital multiplex switch (DMS) which performs the necessary functions as required by the ASK signal. The connections are made by the DMS which performs the functions of connecting the call, for example, to a telephone instrument either in or outside of the private branch exchange system. A similar sequence is followed in the reverse direction.

As will be recognized, the 8 kHz ASK signal is not actually transmitted on the T1 lines, but, rather, a code formed in least significant bits is used to replace that signal to permit reconstruction or regeneration of the ASK at the receiving end in the central office.

While the basic system concept as described above is sound, it has been found that numerous problems exist in the practical implementation of the system which have caused system malfunctions in the field. These problems include the generation of an unacceptable level of noise on the telephone line and the incorrect detection of the ASK information resulting in such malfunctions as mis-dialed numbers, lack of dial tone and the like.

SUMMARY OF THE INVENTION

Accordingly, an object of the present invention is to provide circuit improvements to a digital telephone system which overcomes problems with the prior art apparatus.

Briefly described, the invention includes, in a telephone system of the type having a first location where ASK control or supervisory signals are generated at a frequency significantly above voice band as well as voice signals for transmission to a destination connected to the first location by voice quality telephone lines, means at the first location and of the telephone lines for digitally encoding the voice signals in a plurality of digital words and means for recognizing the presence of the ASK signals for setting the least significant bit of each digital word at one preselected state when an ASK signal is present and a second state when no ASK signal is present, and means at the destination end of the telephone lines for reconstructing the voice signals and for regenerating the ASK signal in response to the LSB states, and wherein the means for reconstructing includes filters circuit means responsive to the presence of the ASK signal to produce an output signal, the improvement comprising shaping circuit means for receiving the ASK signal before that signal is applied to the filter circuit means and for shaping the leading and trailing ends thereof so that the envelope of the signal increases in amplitude gradually and circuit means for coupling the shaped signal to the filter circuit means to thereby reduce the number and amplitude of harmonics produced by the filter circuit means.

BRIEF DESCRIPTION OF THE DRAWINGS

In order to impart full understanding of the manner in which these and other objects are attained in accordance with the invention, particularly advantageous embodiments thereof will be described with reference to the accompanying drawings which form a part of this specification, and wherein.

DESCRIPTION OF THE PREFERRED EMBODIMENTS

Figure 1:
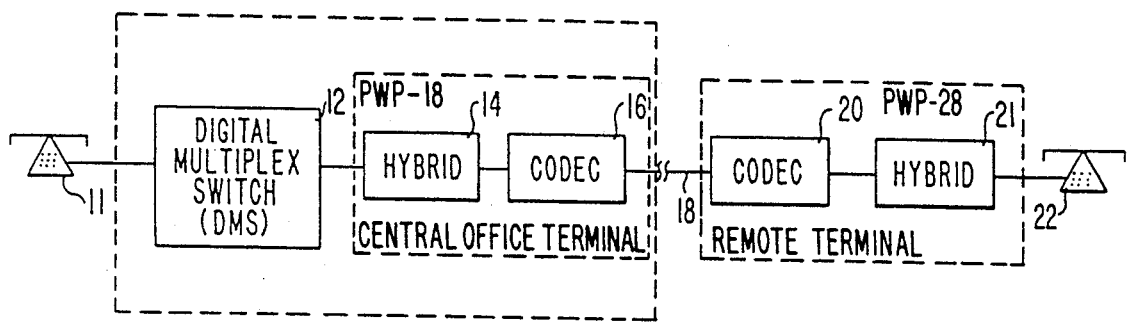
FIG. 1 is a schematic block diagram of a private branch exchange system of the type to which the invention relates.

Referring first to FIG. 1, a rather simplified schematic block diagram of a typical private branch exchange system shown therein includes a telephone instrument 11 which is connected to a digital multiplex switch (DMS) 12 in a central office. Within the central office, the central office terminal includes a hybrid circuit 14 and a CODEC 16 which is coupled to digital link 18 which can be DS-1, optical fiber or some other suitable medium interconnecting the central office with a remote terminal. In the remote terminal is a CODEC 20 and a hybrid circuit 21 which is connected to one or more electronic business sets (EBS) 22 one of which is shown in FIG. 1.

The instrument 11 may or may not be an electronic business set. A function of the equipment in the central office and the remote terminal is to perform the necessary control functions and to convey the voice information between an instrument 11 and EBS 22, or between two EBS instruments, in such a way that the user has no cognition of the existence of the switching equipment, as such. In other words, the equipment should be transparent to the user.

Communication between CODECs 16 and 20 on optical fibers or T1 lines 18 includes transmission of the digital signals mentioned above which include digitized voice signals in digital words the LSB of each of which is set at either low or high level to indicate the presence or absence of an ASK signal. Each CODEC, when it receives a digitized signal from lines 18, must reconstitute the analog voice signal and also regenerate or reconstruct the ASK signal.

Figure 2:
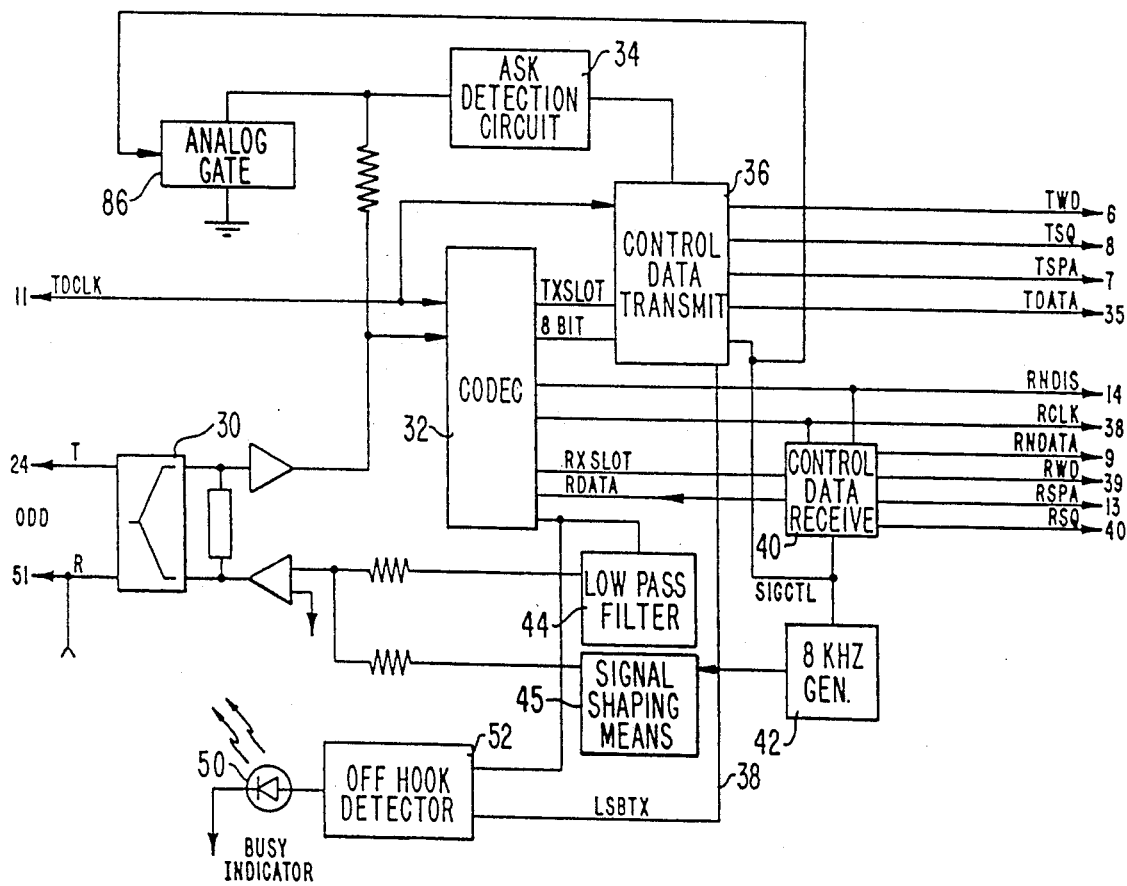
FIG. 2 is a schematic diagram, partly in block form, of a CODEC and associated circuitry incorporating the shaping circuit of the present invention.

FIG. 2 is a simplified schematic diagram, mostly in block form, of a CODEC and associate circuitry to perform this function. The circuitry can be thought of as being in either the central office terminal or the remote terminal since the two are identical and perform the same functions.

Much of the circuitry shown in FIG. 2 is conventional and will not be described in detail. This is particularly true of the hybrid circuit 30 and the CODEC 32 itself. The hybrid circuit, as is well understood, couples the signal to and from the line and delivers the incoming signal to CODEC 32. Control signals and the 8 bit word are delivered to the control data transmit unit 36 to which signals TWD, TSQ, TSPA are inputs used to address the channel units and from which TDATA is an output. The incoming signal through hybrid 30 which includes voice, 8KHz and ring signals is delivered to the ASK detection circuit 34 which includes filters particularly designed to respond to the existence of an ASK signal and produce an output signal when the ASK signal is present, that output signal being used to set the level of the least significant bit.

A control data receive unit 40 receives inputs from RNDATA, RWD, RSPA and RSQ and provides control and data signals to CODEC 32. Of particular importance to the present invention, the control data receive unit recognizes the least significant bit level of the incoming digital signal and, when the presence of an ASK signal is indicated, activates the 8 Khz generator unit 42 which then produces an 8 Khz signal which is coupled to the instrument.

The problem to which the invention relates arises when that signal is received by VF limited filters in the CODEC, DMS-100 and EBS. One difficulty arose from the creation of an unacceptable level of noise during 8 Khz ASK transmission while the user was off-hook. Analysis of the system revealed that the noise was being generated in the various filters used to limit the frequency to the voice band. The noise was created during the instant the ASK was being switched on and off.

It was found that a signal shaper 45 could be incorporated in the circuit at the output of generator 42 for the purpose of causing the 8 Khz signal to ramp on and off rather than being switched on suddenly in the manner of a square wave with sharp leading and trailing edges.

Figure 3:
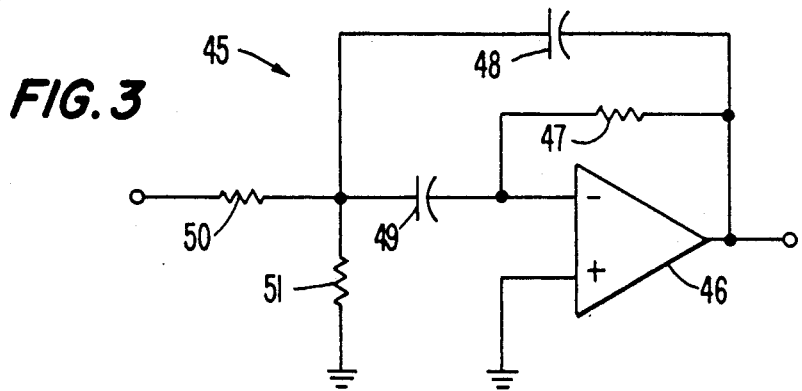
FIG. 3 is a schematic circuit diagram of a shaping circuit usable in the system of FIG. 2.

A suitable shaping circuit for this purpose is shown in FIG. 3. The circuit itself is known in other contexts as a multiple feedback band-pass filter and includes an operational amplifier 46 having a feedback resistor 47 and feedback capacitors 48 and 49. Because of the equivalence of the input levels, input resistors 50 and 51 are also part of the feedback. The values of the resistors and capacitors determine the gain and bandwidth of the circuit.

Figure 4:
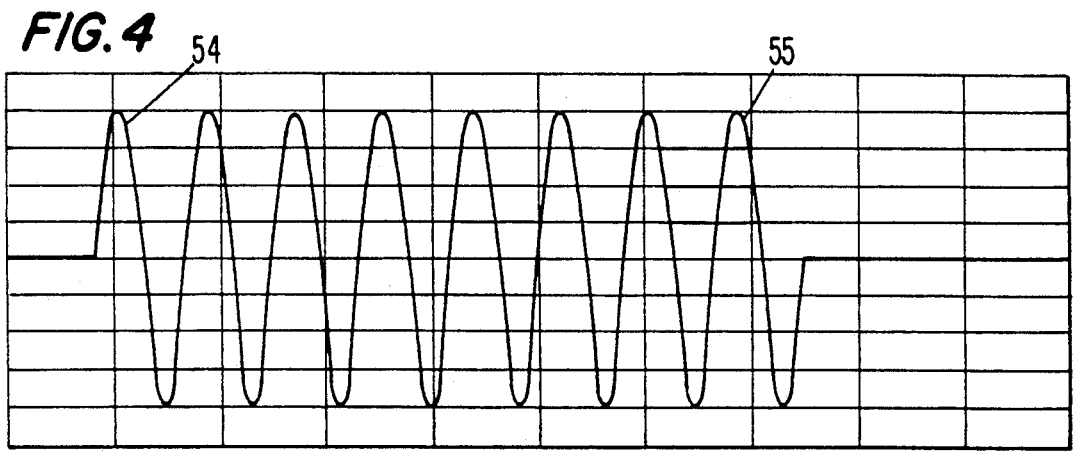
FIGS. 4 and 5 are waveform diagrams illustrating the effect of, the shaping circuit of FIG. 3.
Figure 5:
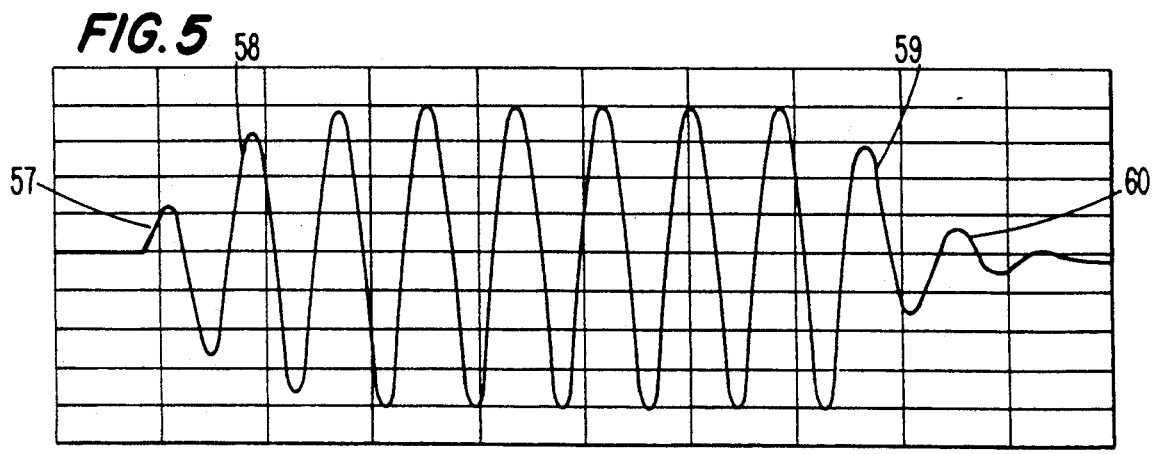

The related signals are illustrated in FIGS. 4 and 5, FIG. 4 showing eight cycles of the 8 Khz signal as produced at the output of generator 42. It will be observed that the first cycle 5 and the last cycle 55 have a relatively sharp leading and trailing edges and that the envelope of the entire 8-cycle signal closely resembles a square wave. The signal shaping circuit 45 modifies the signal so that it appears as shown in FIG. 5 wherein the initial cycles 57 and 58 and the concluding cycles 59 and 60 are of increasing and decreasing amplitudes, respectively, and are lower in amplitude than the middle cycles, thereby resulting in an envelope which has more gently sloping beginning and ending portions. The result of this signal shaping is that the noise is reduced.

An additional problem arising in connection with the system of FIG. 1 relates to the transmission and recognition of correct 8 Khz ASK information between the central office switch (DMS 12) and the users' telephones. As will be recognized, if an improper code is received by the DMS, the result is a failure to respond or an incorrect response. Thus, numbers may be misdialed or no dial tone might be produced.

An analysis of the system revealed that the ASK signal was being distorted by the circuits of FIG. 2 in some cases and this problem was aggravated to some extent by the solution discussed above. As will be apparent from FIG. 5, although the signal envelope is improved in that it has more gently sloping beginning and ending portions, a larger number of cycles of the 8 Khz signal is produced. The additional two or three pulses causes the ASK signal to exist beyond the "window" which is provided for its reception and the additional amount is sometimes interpreted as an additional ASK signal.

Figure 6:
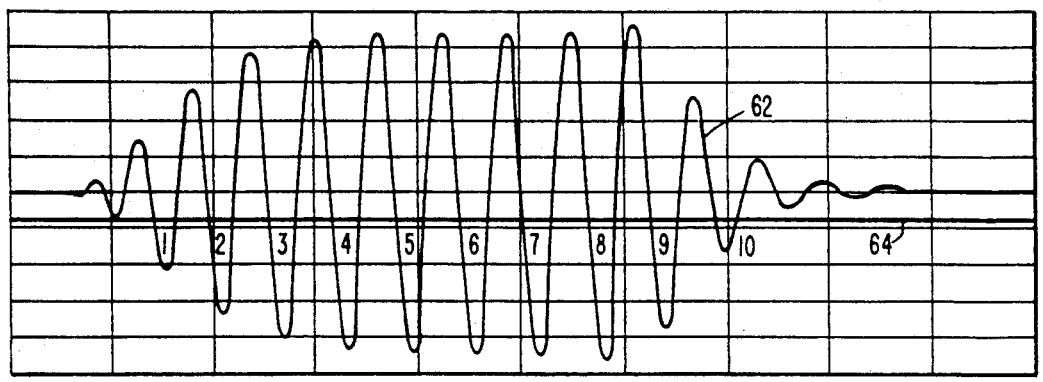
FIG. 6 is a waveform diagram showing recognition of an excessive number of ASK signals.

This is shown more clearly in FIG. 6 in which a possible output of shaping circuit 45 (from the other end of the line) is illustrated at 62 with a detector threshold level shown at 64. As seen in FIG. 6, there are ten portions of the waveform which cross below the threshold. The detector circuit, being designed to recognize 8 pulses as indicating an ASK signal, can misinterpret the extra signals.

Figure 7:
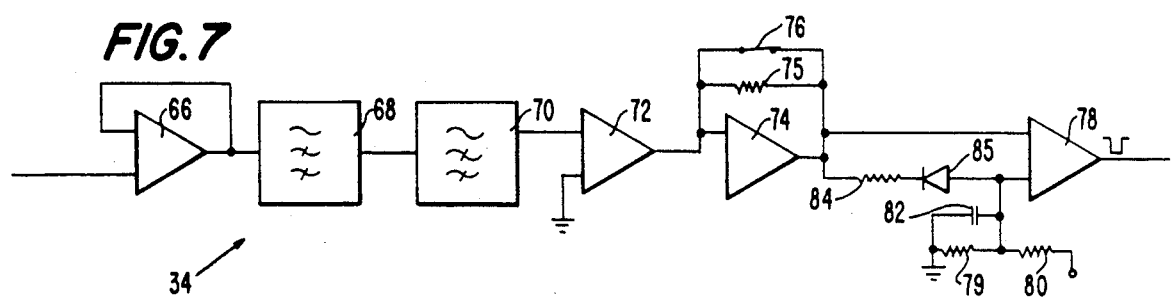
FIG. 7 is a schematic circuit diagram of an ASK detection circuit modified in accordance with the present invention.

A detector circuit of a type currently used is shown in FIG. 7 with the modifications in accordance with the invention to eliminate this problem. Essentially the same circuit is used on both the central office terminal and receiving terminal except for gain settings as will be noted. The circuit shown is otherwise applicable to both units. The input signal, including the ASK signal if one is present, is received at the input to a voltage follower circuit 66 which maintains a high impedance at the detection circuit input. The output of the voltage follower is delivered to the input of a fifth order Butterworth high pass filter 68 having a transfer function of 100 (log F/$F_1$), or 30 db/octave. The output of filter 68 is fed to a third order Butterworth high pass filter 70 having a transfer function of 60 (log F/$F_1$), or 18 db/octave. A 0 dbm 1000 Hz signal supplied to the input of filter 68 will experience approximately 100 db of attenuation before reaching the output of filter 70.

The filtered signal is amplified by operational amplifiers 72 and 74 which boost the filtered 8 kHz signal for proper detection. The gain is typically set at 16 for the COT and, commonly, a somewhat higher level for the RT, depending on the setting a loop switch 76 which shunts a feedback resistor 75 at amplifier 74 in the RT unit only.

The amplified output of circuit 74 is applied to the input of a Schmitt trigger circuit 78 which, in the original circuit, produces a square wave signal when ever the output of the amplifiers reaches the reference level of the Schmitt trigger which is set to −14 db at 8 kHz for the COT and −32 db by resistors 79 and 80 at 8 kHz for the RT. The square wave indicates the detection of a valid ASK 8 kHz code. The output of the Schmitt trigger is delivered to the control data transmit unit 36 in either COT or RT.

In the modification of the present invention, a capacitor 82 is connected in parallel with resistor 79 and a series circuit including a resistor 84 and a diode 85 is connected between the output of amplifier 74 and the reference input of circuit 78. With these modifications, the threshold changes as soon as a signal is received, capacitor 82 being charged to a level approaching the peak value of the signal.

Figure 8:
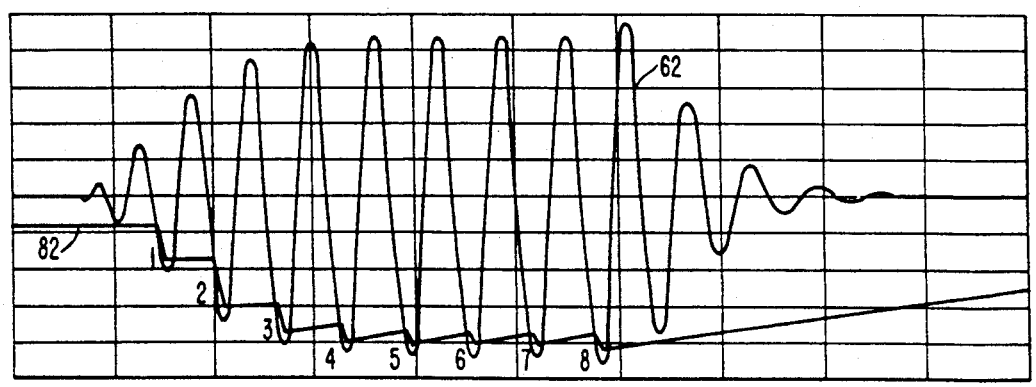
FIG. 8 is a waveform diagram of the waveform of FIG. 6 showing the effect of the circuit of FIG. 7

The result of this is shown in FIG. 8 wherein the waveform 62 is the same as in FIG. 6. The threshold 82 "follows" the first negative-going portion to cross the initial threshold level to a level which is not equal to the peak waveform value but is somewhat more negative than the original threshold as the output of amplifier 74 charges capacitor 82 through diode 85. The values of resistors 79 and 80 are increased to limit the discharging of capacitor 82 so that the threshold reached on the first peak is decreased only slightly when the next negative-going portion of waveform 62 arrives. Each successive portion which is equal to or greater than the prior portion causes a pulse to which trigger circuit 78 can respond with an output, but the discharge of capacitor 82 is slow enough so that the smaller pulses 9 and 10 at the end of the signal are not detected. The circuit output is therefore restricted to 8 pulses which is sufficient for proper response, eliminating the errors.

In addition to the foregoing, it was found that the 8KHz ASK being transmitted by the PWP-28 in the remote terminal was reflected back into the receive section and was being interpreted as another, separated, ASK signal, causing system malfunction. A delay of 312.5 μs is normally used during which the SIGCTL signal blocks control data receive unit 40, but this was not sufficient to prevent the reflection from getting back into the PWP-18 at the COT. The PWP-18 was therefore transmitting 8KHz when it should not have.

To cure this problem, an analog gate 86 is connected to the input of detection circuit 34 and a dropping resistor 87 is connected in the input line to circuit 34. Gate 86 is operated by the SIGCTL signal, shutting down the ASK input for the 312.5 μs interval mentioned above.

While certain advantageous embodiments have been chosen to illustrate the invention, it will be understood by those skilled in the art that various changes and modifications can be made therein without departing from the scope of the invention as defined in the appended claims. For example, either the positive or negative reference can be used for the detection discussed in connection with FIG. 8.

What is claimed is:

1. In a telephone system of the type including means at a first location for generating multicycle ASK control or supervisory signals at a frequency significantly above voice band and voice signals for transmission to a destination connected to said first location by voice quality telephone lines, means at the first location end of the telephone lines for digitally encoding the voice signals in a plurality of digital words and means for recognizing the presence of the ASK signals for setting the least significant bit of each said digital word to one preselected state when an ASK signal is present and to a second state when no ASK signal is present, and means at the destination end of the telephone lines for reconstructing the voice signals and for regenerating the ASK signal in response to the LSB states, and wherein said means for reconstructing includes filter circuit means responsive to the presence of the ASK signal to produce an output signal, the improvement comprising shaping circuit means for receiving the ASK signal before said signal is applied to said filter circuit means and for shaping the envelope of the signal so that the leading and trailing ends thereof increase and decrease to and from a full amplitude level in an interval greater than one cycle of said ASK signal and circuit means for coupling said shaped signal to said filter circuit means to thereby reduce the number and amplitude of harmonics produced by said filter circuit means.

2. A system according to claim 1 which further includes detector circuit means responsive to a predetermined number of pulses of the regenerated ASK signals for subsequent use to perform address and switching functions, said detector circuit means comprising means for establishing a threshold level for said detector circuit means such that said detector circuit means responds only to pulses exceeding said threshold, and storage circuit means for causing said threshold substantially to follow the envelope of said detected signal whereby reduced-amplitude pulses occurring near the end of said ASK signal are not detected.

3. A system according to claim 2 wherein said first location and said destination each have means for reconstructing including filter circuit means, said system further comprising means at said first location for interrupting the input to said filter circuit means at said first location when said means for generating ASK signals is transmitting ASK signals to said destination.

4. In a telephone system of the type including means at a first location for generating multicycle ASK control or supervisory signals at a frequency significantly above voice band and voice signals for transmission to a destination connected to said first location by voice quality telephone lines, means at the first location end of the telephone lines for digitally encoding the voice signals in a plurality of digital words and means for recognizing the presence of the ASK signals for setting at least one significant bit of each said digital word to one preselected state when an ASK signal is present and to a second state when no ASK signal is present, and means at the destination end of the telephone lines for reconstructing the voice signals and for regenerating the ASK signal in response to said one preselected state of said at least one significant bit, and wherein said means for reconstructing includes filter circuit means responsive to the presence of the ASK signal to produce an output signal, the improvement comprising shaping circuit means for receiving the ASK signal before said signal is applied to said filter circuit means and for shaping the envelope of the signal so that the leading and trailing ends thereof increase and decrease to and from a full amplitude level in an interval greater than one cycle of said ASK signal, and circuit means for coupling the shaped signal to said filter circuit means to thereby reduce the number and amplitude of harmonics produced by said filter circuit means.

5. In a telephone system of the type including means at a first location for generating multicycle ASK control or supervisory signals at a frequency significantly above voice band and voice signals for transmission to a destination connected to said first location by voice quality telephone lines, means at the first location end of the telephone lines for digitally encoding the voice signals in a plurality of digital words and means for recognizing the presence of the ASK signals for setting at least one significant bit of each said digital word to one preselected state when an ASK signal is present and to a second state when no ASK signal is present, and means at the destination end of the telephone lines for reconstructing the voice signals and for regenerating the ASK signal in response to said one preselected state of said at least one significant bit, and wherein said means for reconstructing includes filter circuit means responsive to the presence of the ASK signal to produce an output signal, the improvement comprising shaping circuit means for receiving the ASK signal before said signal is applied to said filter circuit means and for shaping the envelope of the signal so that the leading edge thereof increases from an initial voltage level to a full amplitude level in an interval greater than one cycle of said ASK signal, and circuit means for coupling the shaped signal to said filter circuit means to thereby reduce the number and amplitude of harmonics produced by said filter circuit means.

6. A system according to claim 5 wherein said first location and said destination each have means for reconstructing including filter circuit means, said system further comprising means at said first location for interrupting the input to said filter circuit means at said first location when said means for generating ASK signals is transmitting ASK signals to said destination.

* * * * *